United States Patent
Zhao et al.

(10) Patent No.: US 11,182,318 B2
(45) Date of Patent: Nov. 23, 2021

(54) PROCESSOR AND INTERRUPT CONTROLLER

(71) Applicant: ALIBABA GROUP HOLDING LIMITED, Grand Cayman (KY)

(72) Inventors: Chaojun Zhao, Hangzhou (CN); Xiaoyan Xiang, Shanghai (CN); Chen Chen, Shanghai (CN); Taotao Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/828,453

(22) Filed: Mar. 24, 2020

(65) Prior Publication Data
US 2020/0311000 A1    Oct. 1, 2020

(30) Foreign Application Priority Data
Mar. 27, 2019    (CN) .......................... 201910238111.9

(51) Int. Cl.
*G06F 13/26*    (2006.01)
*G06F 13/40*    (2006.01)
(Continued)

(52) U.S. Cl.
CPC .......... *G06F 13/26* (2013.01); *G06F 9/30101* (2013.01); *G06F 9/485* (2013.01); *G06F 9/4818* (2013.01); *G06F 13/4031* (2013.01)

(58) Field of Classification Search
CPC .... G06F 13/26; G06F 9/30101; G06F 9/4818; G06F 9/485; G06F 13/4031
(Continued)

(56) References Cited

U.S. PATENT DOCUMENTS 4,402,042 A * 8/1983 Guttag ................ G06F 9/30145
712/207
5,163,152 A * 11/1992 Okamoto ................ G06F 13/26
710/260
(Continued)

OTHER PUBLICATIONS

International Search Report and written opinion in related International Application No. PCT/US2020/024451, dated Jul. 6, 2020 (11 pgs).

*Primary Examiner* — Paul R. Myers
(74) *Attorney, Agent, or Firm* — Finnegan, Henderson, Farabow, Garrett & Dunner, LLP

(57) ABSTRACT

Embodiments of the present disclosure provide an interrupt controller in a processor, comprising: an interrupt sampling circuitry configured to receive one or more interrupts from one or more interrupt sources that are communicatively coupled to the interrupt controller; and an arbitration circuitry configured to select a to-be-responded interrupt from the received one or more interrupts, the arbitration circuitry comprising: a selection circuitry configured to select from the one or more interrupts a highest-priority interrupt that has a highest priority among the one or more interrupts; and a threshold comparison circuitry communicatively coupled to the selection circuitry, the threshold comparison circuitry configured to compare the priority of the highest-priority interrupt with a preset priority threshold, wherein the arbitration circuitry is configured to select the highest-priority interrupt as the to-be-responded interrupt in response to the threshold comparison circuitry determining that the priority of the highest-priority interrupt is higher than the preset priority threshold.

13 Claims, 5 Drawing Sheets

(51) Int. Cl.
*G06F 9/48* (2006.01)
*G06F 9/30* (2018.01)

(58) Field of Classification Search
USPC .................................................. 713/260–269
See application file for complete search history.

(56) References Cited

U.S. PATENT DOCUMENTS

| | | | | |
|---|---|---|---|---|
| 5,410,710 | A * | 4/1995 | Sarangdhar | G06F 13/26 710/264 |
| 5,530,804 | A * | 6/1996 | Edgington | G06F 11/2236 703/28 |
| 5,928,348 | A * | 7/1999 | Mukai | G06F 13/24 710/263 |
| 6,185,647 | B1 * | 2/2001 | Shibuya | G06F 13/4031 710/107 |
| 9,009,368 | B2 * | 4/2015 | White | G06F 13/24 710/48 |
| 2004/0199694 | A1 * | 10/2004 | Yiu | G06F 13/26 710/264 |
| 2006/0112208 | A1 * | 5/2006 | Accapadi | G06F 13/26 710/265 |
| 2010/0023666 | A1 * | 1/2010 | Mansell | G06F 9/45558 710/267 |
| 2011/0016295 | A1 | 1/2011 | Catherwood et al. | |
| 2011/0283033 | A1 * | 11/2011 | Yamada | G06F 11/1641 710/261 |
| 2014/0359356 | A1 * | 12/2014 | Aoki | G06F 9/485 714/24 |
| 2019/0034443 | A1 * | 1/2019 | Sima | G06F 16/13 |
| 2019/0050356 | A1 | 2/2019 | Hellwig et al. | |

* cited by examiner

PROCESSOR AND INTERRUPT CONTROLLER

CROSS REFERENCE TO RELATED APPLICATION

This disclosure claims the benefits of priority to Chinese application number 201910238111.9, filed Mar. 27, 2019, which is incorporated herein by reference in its entirety.

BACKGROUND

Processors can process interrupts from interrupt sources, such as an input/output ("I/O") device or a timer. Processors can process interrupts by executing an interrupt service routine. Since processors need to process different interrupts from a plurality of interrupt sources, each interrupt can have its respective interrupt priority and interrupt vector. An interrupt with a higher interrupt priority needs to be processed first. At the same time, it is also evaluated whether an interrupt that has been waiting for a long time can be processed in real time to avoid occupying processor resources for too long. Therefore, how the processor can efficiently process various interrupts with different priorities when processing a plurality of interrupts is a major issue in the field of processors.

In addition, a processor resource of a low-priority interrupt can be preempted by a high-priority interrupt. If the low-priority interrupt does not release other resources required for a processing of the high-priority interrupt, a "deadlock" situation can take place where execution of the interrupt with a higher priority cannot be executed. Therefore, it is also important for processors to be capable of efficiently processing various interrupts with different priorities. A new interrupt controller solution in a processor is needed to achieve a more efficient interrupt processing mode, so as to speed up interrupt responding and processing.

SUMMARY

Embodiments of the present disclosure provide an interrupt controller in a processor. The interrupt controller comprises an interrupt sampling circuitry configured to receive one or more interrupts from one or more interrupt sources that are communicatively coupled to the interrupt controller; and an arbitration circuitry configured to select a to-be-responded interrupt from the received one or more interrupts, the arbitration circuitry comprising: a selection circuitry configured to select from the one or more interrupts a highest-priority interrupt that has a highest priority among the one or more interrupts; and a threshold comparison circuitry communicatively coupled to the selection circuitry, the threshold comparison circuitry configured to compare the priority of the highest-priority interrupt with a preset priority threshold, wherein the arbitration circuitry is configured to select the highest-priority interrupt as the to-be-responded interrupt in response to the threshold comparison circuitry determining that the priority of the highest-priority interrupt is higher than the preset priority threshold.

Embodiments of the present disclosure further provides method for a method for executing interrupts in a processor. The method comprises: receiving one or more interrupts from one or more interrupt sources; selecting from the one or more interrupts a highest-priority interrupt that has a highest priority among the one or more interrupts; comparing the priority of the highest-priority interrupt with a preset priority threshold; and in response to a comparison that the priority of the highest-priority interrupt is higher than the preset priority threshold, selecting the highest-priority interrupt as a to-be-responded interrupt.

Embodiments of the present disclosure further provides a non-transitory computer readable medium that stores a set of instructions that is executable by one or more processors of an apparatus to cause the apparatus to initiate an instruction execution method for executing interrupts in a processor. The method comprises: receiving one or more interrupts from one or more interrupt sources; selecting from the one or more interrupts a highest-priority interrupt that has a highest priority among the one or more interrupts; comparing the priority of the highest-priority interrupt with a preset priority threshold; and in response to a comparison that the priority of the highest-priority interrupt is higher than the preset priority threshold, selecting the highest-priority interrupt as a to-be-responded interrupt.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the protective scope of the present disclosure.

Figure 1:
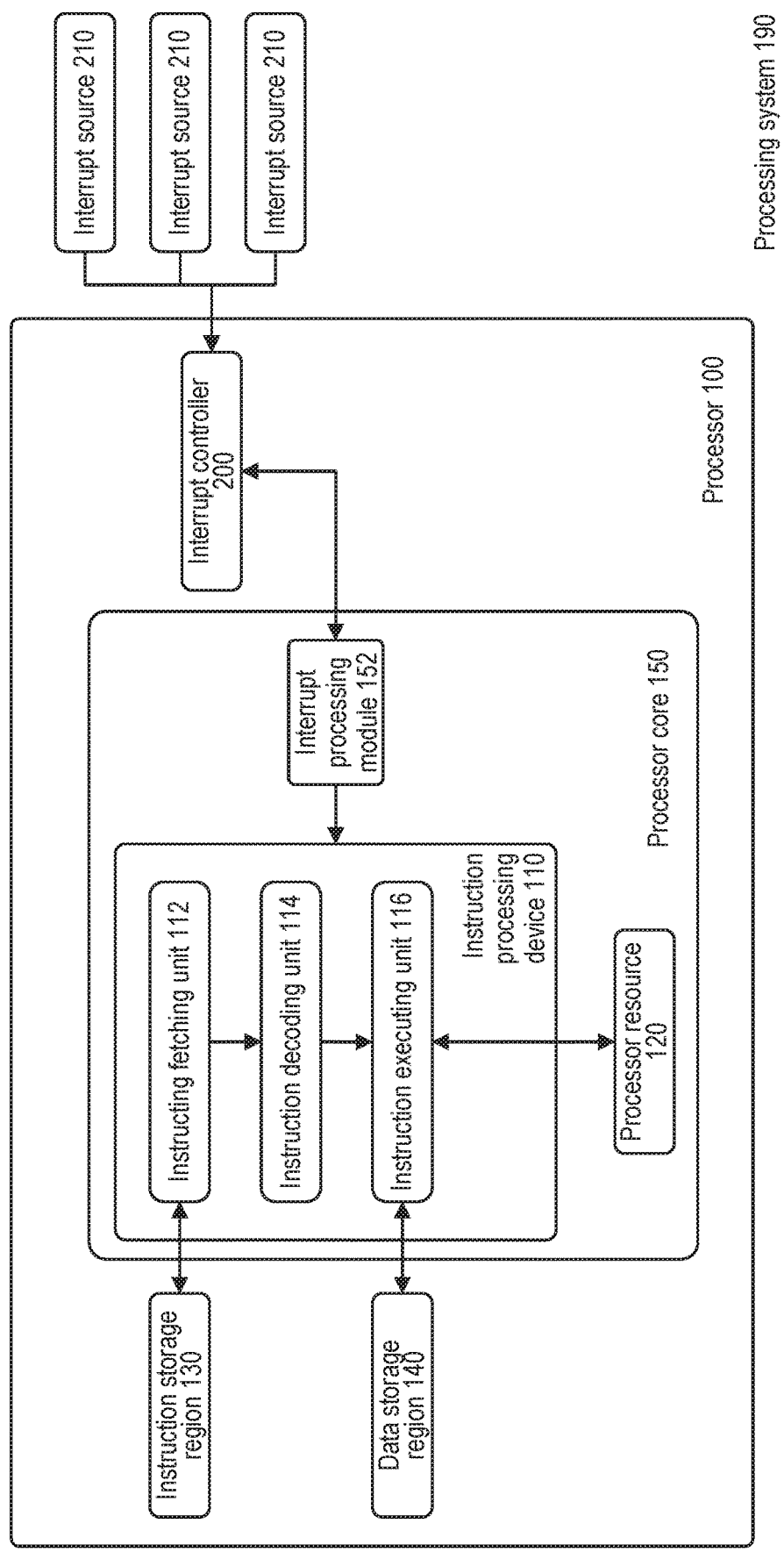
FIG. 1 is a schematic diagram of an example processor, according to some embodiments of the present disclosure.

FIG. 1 is a schematic diagram of an example processor, according to some embodiments of the present disclosure. As shown in FIG. 1, a processing system 190 includes a processor 100 and one or more interrupt sources 210. In some embodiments, interrupt sources 210 can be I/O devices, timers, or software-based interrupts. In some embodiments, interrupt sources 210 can be communicatively coupled to processor 100. Interrupt sources 210 can generate various types of interrupts for processor 100 to process. In some embodiments, processor 100 can include a processor core 150 and an interrupt controller 200. In some embodiments, processor core 150 can further include an instruction processing device 110 and a processor resource 120. Instruction processing device 110 can be an instruction processing component in processor 100. The content to be processed can include taking out instructions for decoding and executing a variety of decoded instructions. In some embodiments, instruction processing device 110 can also make responses in the interrupts. In addition, instruction processing device 110 can change a program flow executed by the instructions in processor 100, and execute a corresponding interrupt handler. In some embodiments, instruction processing device 110 can be a logical division of the functions of processor 100.

In some embodiments, instruction processing device 110 can include an instruction fetching unit 112, an instruction decoding unit 114, and an instruction executing unit 116. In some embodiments, instruction fetching unit 112, instruction decoding unit 114, or instruction executing unit 116 can include circuitries. Instruction fetching unit 112 can fetch a to-be-executed instruction from an instruction storage region 130, and send the fetched instruction to instruction decoding unit 114.

An instruction can include an operation code and an address code. The operation code can indicate an operation to be executed. The address code can indicate an address or content of an operation object when the operation code is executed. Instruction decoding unit 114 can decode and analyze an instruction to determine an operation code of the instruction and determine the nature and method of the operation.

In some embodiments, instruction decoding unit 114 can send the decoded instruction to instruction executing unit 116, and instruction executing unit 116 can execute the instruction. In some embodiments, instruction executing unit 116 can include a variety of execution units configured to execute special instructions. It is appreciated that the present disclosure is not limited to the specific form of the instruction executing units for executing the special instructions, and all instruction executing units 116 that can execute instructions are encompassed in the protection scope of the present disclosure.

In some embodiments, instruction executing unit 116 can access processor resource 120, including a variety of registers and a data storage region 140 during execution. For example, data can be acquired from these registers and data storage region 140, and an execution result can be written to the registers or a data storage space.

Processor core 150 can further include an interrupt processing module 152. In some embodiments, interrupt processing module 152 can include circuitries. Interrupt processing module 152 can respond to an external interrupt while instruction processing device 110 can perform instruction processing. As a result, instruction processing device 110 can change a program being executed currently in the processor and run an interrupt service routine corresponding to the external interrupt to process the interrupt.

In some embodiments, when processor core 150 responds to an interrupt, processor 150 can first store a current processor state and an execution site of the processor (e.g., a program counter PC of the processor). Further, processor 150 can acquire an entry address of the interrupt service routine according to interrupt information of the responded interrupt, and can be redirected to the address to start processing an interrupt task. After processing the interrupt task, processor core 150 can execute an interrupt return instruction, and the processor can restore the previously stored processor state and return to the previous execution site (the stored PC) to resume the execution. In some embodiments, interrupt processing module 152 can process the above interrupt response through instruction processing device 110.

In some embodiments, interrupt controller 200 can be communicatively coupled to processor core 150. Interrupt controller 200 can select a to-be-processed interrupt and send the to-be-processed interrupt to processor core 150 for processing. In some embodiments, each interrupt has a corresponding interrupt priority and corresponding interrupt vector. Processor 100 can determine an order to process interrupts according to interrupt priorities of the interrupts. In some embodiments, when a plurality of interrupts occur at the same time, a high-priority interrupt can be processed first. Processor 100 can also determine, according to interrupt vector of an interrupt, an interrupt service routine corresponding to the interrupt. For example, a base address of the interrupt service routine can be stored in an interrupt register of processor resource 120, and processor 100 can determine, according to the base address and the interrupt vector, an entry address corresponding to the interrupt service routine. Processor 100 can then change the execution site (e.g., the PC of the processor) to point to the entry address, thus allowing processor 100 to execute the interrupt service routine.

Figure 2:
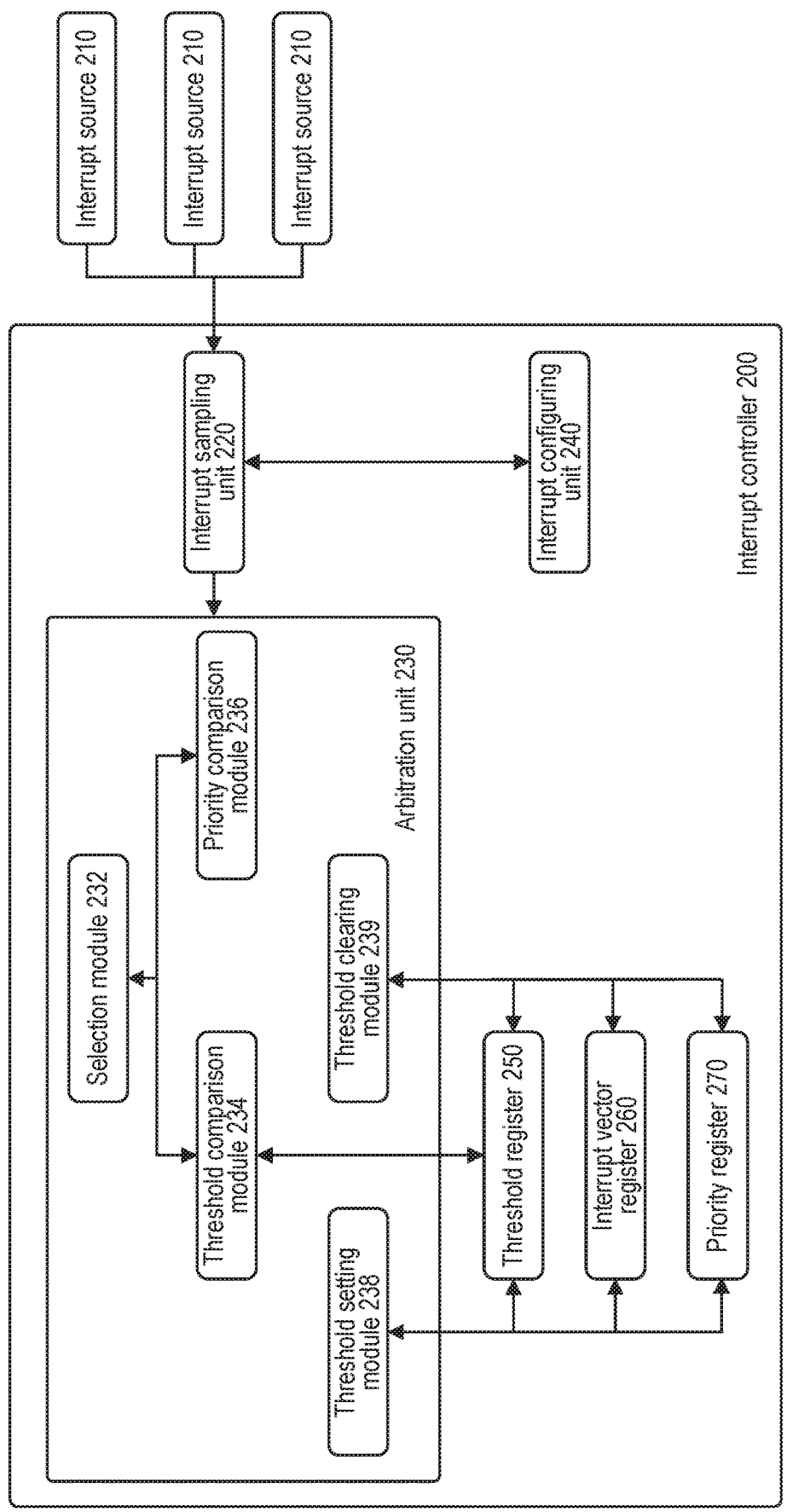
FIG. 2 is a schematic diagram of an example interrupt controller, according to some embodiments of the present disclosure.

FIG. 2 is a schematic diagram of an example interrupt controller, according to some embodiments of the present disclosure. As shown in FIG. 2, interrupt controller 200 can be communicatively coupled with a plurality of interrupt sources 210. In some embodiments, interrupt sources 210 can be I/O devices, timers, or software-based interrupts. Interrupt controller 200 can acquire interrupts from the plurality of interrupt sources 210 and select an interrupt to be sent to processor core 150 (not shown on FIG. 2) for processing.

As shown in FIG. 2, interrupt controller 200 can include an interrupt sampling unit 220 and an arbitration unit 230. In some embodiments, interrupt sampling unit 220 or arbitration unit 230 can include circuitries. Interrupt sampling unit 220 can receive one or more interrupts of various types of interrupts from the plurality of interrupt sources 210 communicatively coupled to interrupt controller 200. In some embodiments, a clock of interrupt source 210 can be asynchronous with a clock of the processor. Sampling unit 220 can synchronize external interrupt source 210 with the clock of the processor, and samples external interrupt source 210 to produce effective interrupt information. In addition, interrupt source 210 has two different trigger properties: level trigger and edge trigger (or pulse trigger), which can be sampled and unified into one processing manner through interrupt sampling unit 220.

Arbitration unit 230 can select, from the various types of interrupts received from interrupt sampling unit 220, an interrupt to be sent to processor core 150 for responding. In some embodiments, arbitration unit 230 can include a selection module 232 and a threshold comparison module 234. In some embodiments, selection module 23 and threshold comparison module 234 can include circuitries. Selection module 232 can select a highest-priority interrupt from the various types of interrupts it receives. In some embodiments, each interrupt can have preconfigured interrupt information. The preconfigured interrupt information can include an interrupt priority and an interrupt vector.

In some embodiments, the preconfigured interrupt information can be stored in an interrupt configuring unit 240 of interrupt controller 200. Interrupt information (including interrupt priorities and interrupt processing states) of the various types of interrupts can be stored in interrupt configuring unit 240. An interrupt priority of an interrupt can be configured in interrupt configuring unit 240, so that processor 100 can schedule a responding process on the interrupt according to the interrupt priority. In some embodiments, depending on how an interrupt is processed by the processor, the interrupt can have a plurality of processing states, including interrupt pending, interrupt active, etc. The interrupt pending state indicates that the interrupt has been generated by interrupt source 210 and received by interrupt sampling unit 220 but has not been responded to or processed by processor core 150. The interrupt active state indicates that the interrupt has been received by interrupt sampling unit 220 and processed by processor core 150, but the interrupt has not finished processing. For example, the interrupt can be currently processed in processor core 150, or processor core 150 first executes a high-priority interrupt due to interrupt nesting and the interrupt has been temporarily suspended.

In some embodiments, the interrupt nesting means that processor core 150 receives a new interrupt with a higher priority when processing an interrupt with a lower priority. In this case, processor core 150 can suspend the processing on the interrupt with the lower priority, store the site of the interrupt (e.g., a current program counter PC and content of a related register), and start performing processing corresponding to the interrupt with a higher priority. In some embodiments, when there are many levels involved in interrupt nesting, a lot of resources of the processor can be consumed due to storage of more interrupt information.

In some embodiments, interrupt configuring unit 240 can store configuration information of the various interrupts using registers. States of the various interrupts can be modified by changing values of the registers corresponding to the interrupts.

In some embodiments, enable bits of the various interrupts can also be stored in interrupt configuring unit 240 to indicate whether the interrupt is adopted and processed. Interrupt sampling unit 220 can decide, according to the value of the enable bit of each interrupt, whether to adopt the interrupt.

In some embodiments, selection module 232 can select an interrupt with the highest priority according to the configuration information of the interrupts stored in interrupt configuring unit 240. In some embodiments, selection module 232 can select an interrupt with the highest priority from the interrupts in a pending state and the interrupts newly adopted by sampling unit 220. In some embodiments, after each interrupt is sampled by sampling unit 220, the interrupt processing state in interrupt configuring unit 240 can be modified to a pending state, and then selection module 232 can select an interrupt with the highest priority from all the interrupts that are in a pending state to perform subsequent processing. The present disclosure is not limited to the specific form in which selection module 232 selects an interrupt, and all the manners in which a highest-priority interrupt can be selected from interrupts not processed by processor core 150 currently are encompassed in the protection scope of the present disclosure.

In some embodiments, threshold comparison module 234 can be communicatively coupled to selection module 232 and compare the priority of the highest-priority interrupt with the highest priority selected by selection module 232 with a preset priority threshold. Arbitration unit 230 can select the highest-priority interrupt as an interrupt to be output to processor core 150 for responding and processing when threshold comparison module 234 determines that the priority of the highest-priority interrupt is higher than the priority threshold. Threshold comparison module 234 in arbitration unit 230 can set the priority threshold to shield interrupts having a lower priority from being sent to processor core 150 for responding and processing. As a result, when a plurality of interrupts are being processed in processor core 150 and interrupt nesting occurs, interrupts currently nested can be processed by processor core 150 first, so as to reduce the processor resource occupation caused by interrupt nesting.

There can be several ways to clear the priority threshold so that threshold comparison module 234 is disabled. In some embodiments, the priority threshold can be cleared by not setting the value of the priority threshold, or by setting the priority threshold to an invalid value (e.g., "NULL"). In some embodiments, a corresponding enable bit can be set to indicate whether threshold comparison module 234 is disabled. For example, when arbitration unit 230 outputs an interrupt with the highest priority without the need for priority threshold comparison, the enable bit can be set so that threshold comparison module 234 is disabled. In some embodiments, the priority threshold can be set to the lowest priority value, so that the priorities of all the interrupts can be higher than the priority threshold, and threshold comparison module 234 is practically disabled.

In some embodiments, the priority threshold can be stored in a threshold register 250 and can be configured and modified. The present disclosure is not limited to the specific storage form of the priority threshold, and all the manners capable of reading and modifying the priority threshold are encompassed in the protection scope of the present disclosure.

In some embodiments, arbitration unit 230 can also include a threshold setting module 238 and a threshold clearing module 239. In some embodiments, threshold setting module 238 and threshold clearing module 239 can include circuitries. Threshold setting module 238 can be configured to set the priority threshold, and threshold clearing module 239 can be configured to clear the priority threshold. In some embodiments, threshold clearing module 239 can automatically trigger the clearing of the priority threshold when a predetermined condition is met. In some embodiments, threshold clearing module 239 can clear the priority threshold by setting the priority threshold to the lowest priority. In some embodiments, threshold clearing module 239 can clear the priority threshold by setting the priority threshold to an invalid value (e.g., "NULL"). Threshold comparison module 234 can be enabled by setting the priority threshold through threshold setting module 238, and threshold comparison module 234 can be disabled by allowing threshold clearing module 239 to automatically clear the priority threshold when a condition is met. By setting a priority threshold for an interrupt, the interrupt can be processed quickly without affecting the processing on other interrupts.

In some embodiments, interrupt controller 200 can include an interrupt vector register 260. Threshold setting module 238 can, when setting the priority threshold, store interrupt vector corresponding to the priority threshold in interrupt vector register 260. For example, in order to enable an interrupt having an interrupt vector of 16 and an interrupt priority of 2 to be processed as soon as possible, threshold setting module 238 can set the priority threshold as 2 to prevent interrupts having a priority higher than or equal to the threshold of 2 from being sent to the processor core 150 for processing. At the same time, threshold setting module 238 can store the interrupt vector of 16 in interrupt vector register 260.

In some embodiments, when processor core 150 completes processing on a current interrupt, threshold clearing module 239 can acquire an interrupt vector of the current interrupt from processor core 150 and clear the priority threshold if the interrupt vector is equal to the interrupt vector stored in interrupt vector register 160, so that threshold comparison module 234 is disabled.

In some embodiments, interrupt controller 200 can include a priority register 270. Threshold setting module 238 can, when setting the priority threshold, store an interrupt priority of an interrupt that is to be processed first but has a priority not higher than the priority threshold in priority register 270. For example, to enable an interrupt having an interrupt priority of 2 to be processed as soon as possible, threshold setting module 238 can set the priority threshold as 2 to prevent interrupts having a priority higher than or equal to the threshold of 2 from being sent to processor core 150 for processing. At the same time, threshold setting module 238 can store the interrupt priority of 2 in priority register 270.

In some embodiments, when processor core 150 completes processing on a current interrupt, threshold clearing module 239 can acquire an interrupt priority of the current interrupt from processor core 150 and clear the priority threshold if the interrupt priority is equal to the interrupt priority stored in priority register 160, so that threshold comparison module 234 is disabled.

In some embodiments, an interrupt return instruction can be executed when processor core 150 intends to complete processing on an interrupt. Interrupt controller 200 or threshold clearing module 239 can be triggered when processor core 150 executes the interrupt return instruction, and can acquire an interrupt priority or an interrupt vector of an interrupt being executed currently from processor core 150. For example, threshold clearing module 239 can acquire, by reading a certain register in processor core 150, an interrupt priority or an interrupt vector of an interrupt being executed currently.

In some embodiments, when interrupts in processor core 150 are not nested, it is unnecessary to set a priority threshold since there may be no interrupt or only one interrupt being processed in processor core 150. As a result, threshold clearing module 239 can clear the priority threshold at this point.

In some embodiments, threshold clearing module 239 can determine whether there is interrupt nesting by reviewing interrupt processing states of the various interrupts stored in interrupt configuring unit 240. The interrupt processing states of the various interrupts can indicate whether the corresponding interrupts have been responded to or the corresponding interrupts are being processed by processor core 150. When only one interrupt or no interrupt is processed by processor core 150 according to the processing states of the various interrupts in interrupt configuring unit 240, it can be determined that there is no interrupt nesting at this time, and threshold clearing module 239 can clear the priority threshold accordingly.

In some embodiments, threshold setting module 238 can be configured to set a priority threshold for an interrupt that is currently being responded to and processed by processor core 150, therefore preventing an interrupt having a higher interrupt priority from being responded to by processor core 150. As a result, threshold setting module 238 can set the interrupt priority of the interrupt currently being processed as the priority threshold to enable threshold comparison module 234.

In some embodiments, threshold setting module 238 can set the priority threshold according to interrupt processing information of the various interrupts stored in interrupt configuring unit 240. Threshold setting module 238 can select an interrupt, for which a priority threshold needs to be set, from interrupts of which the interrupt processing states are interrupt active. Threshold setting module 238 can also set the priority threshold as the priority of the selected interrupt.

Figure 3:
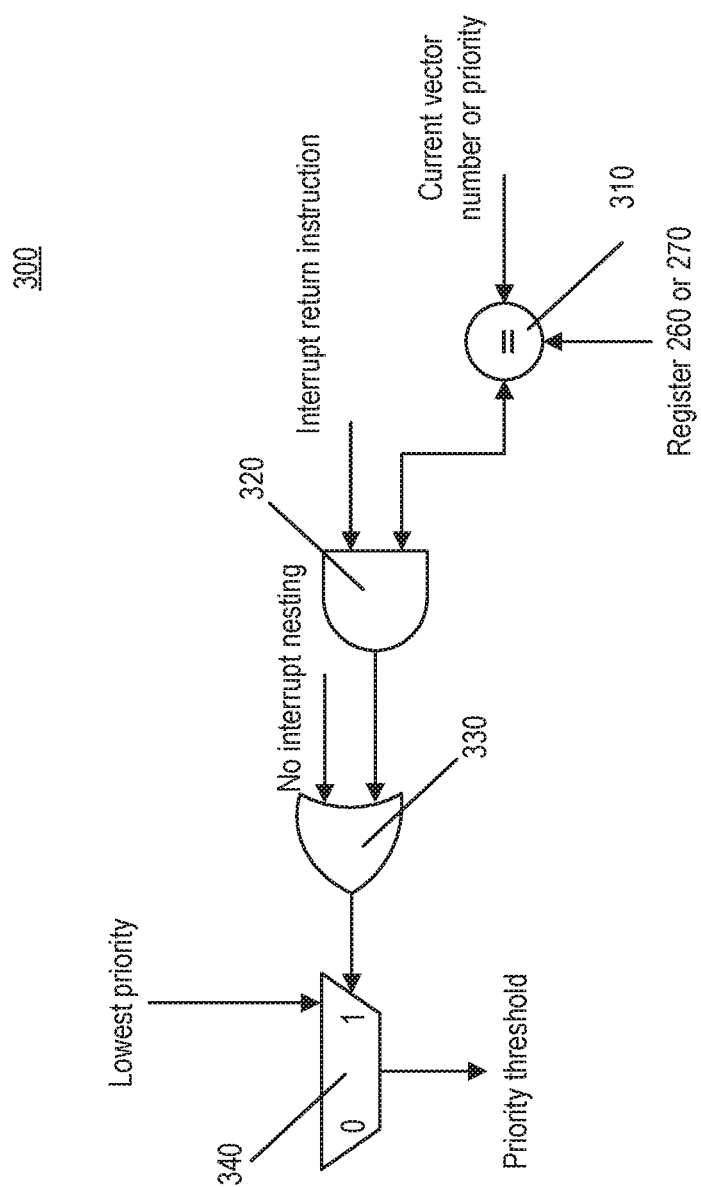
FIG. 3 is a schematic diagram of an example threshold clearing module, according to some embodiments of the present disclosure.

FIG. 3 is a schematic diagram of an example threshold clearing module according to some embodiments of the present disclosure. FIG. 3 shows a logical implementation 300 of threshold clearing module 239. It is appreciated that logical implementation 300 shown in FIG. 3 can be a part of threshold clearing module 239 of FIG. 2. As shown in FIG. 3, a comparator 310 can compare a priority or an interrupt vector of the interrupt being processed in processor core 150 with a value in priority register 270 or interrupt vector register 260. An "AND" gate 320 can perform an "AND" operation on an output from comparator 310 and the interrupt return instruction of the processor. An "OR" gate 330 can receive an output of "AND" gate 320 and an indicator of interrupt nesting, and "OR" gate 330 can output to a 2-to-1 multiplexer 340 as a control input to multiplexer 340.

In some embodiments, during execution of the logic circuit, multiplexer 340 can select a value of the lowest priority as the priority threshold when the output of "OR" gate 330 is 1, thus clearing the priority threshold. As a result, threshold comparison module 234 can be disabled. To make the output of "OR" gate 330 be 1, an indicated value of interruption nesting can indicate that there is no interruption nesting (e.g., a value of 1) or the output of "AND" gate 320 can be 1. In some embodiments, the output of "AND" gate 320 is 1 only if the priority or interrupt vector of the interrupt being processed is equal to the value in priority register 270 or interrupt vector register 260 (e.g., the output of comparator 310 is 1 in this case) and there is a processor interrupt return instruction.

In some embodiments, according to logical implementation 300 of threshold clearing module 239 in FIG. 3, when there is no interrupt nesting, threshold clearing module 239 can clear the priority threshold to disable threshold comparison module 234. When there is interrupt nesting, threshold clearing module 239 may also clear the priority threshold to disable threshold comparison module 234 when the processing on the interrupt is completed (e.g., the processor executes the interrupt return instruction) and the priority or interrupt vector of the interrupt being processed is the value in priority register 270 or interrupt vector register 260.

Referring back to FIG. 2, in some embodiments, arbitration unit 230 can further include a priority comparison module 236. In some embodiments, priority comparison module 236 can include circuitries. Priority comparison module 236 can be communicatively coupled to selection module 232 and compare the priority of the highest-priority interrupt selected by selection module 232 with the priority of the interrupt being processed currently in processor core 150. In some embodiments, when the priority of the highest-priority interrupt is higher than the priority of the interrupt being processed currently, priority comparison module 236 determines that the highest-priority interrupt can be selected as an interrupt to be responded to by processor core 150.

Arbitration unit 230 can determine, according to the comparison results of threshold comparison module 234 and priority comparison module 236, whether to send the highest-priority interrupt to processor core 150. In some embodiments, arbitration unit 230 can send the selected highest-priority interrupt to the processor core for processing only when threshold comparison module 234 determines that the priority of the highest-priority interrupt is higher than the priority threshold and priority comparison module 236 determines that the priority of the highest-priority interrupt is higher than the priority of the interrupt being processed currently.

The present disclosure is not limited to the comparison order of threshold comparison module 234 and priority comparison module 236, and all the manners in which the comparison results of threshold comparison module 234 and priority comparison module 236 can be taken into account together are encompassed in the protection scope of the present disclosure.

In some embodiments, processor core 150 can receive an interrupt output by interrupt controller 200. When processor core 150 is processing an interrupt and an interrupt priority of the interrupt output by interrupt controller 200 is higher than a priority of the interrupt being processed by processor core 150, the processing on the current interrupt can be suspended, and processing on the interrupt selected by interrupt controller 150 can start, resulting in interrupt nesting.

In addition, when priority comparison module 236 in arbitration module 230 is disabled or arbitration module 230 does not include priority comparison module 236, if it is possible that the interrupt priority of the interrupt output by interrupt controller 200 is not higher than that of the interrupt being processed in processor core 150, processor core 150 does not process the interrupt selected by interrupt controller 200 and sets the interrupt processing state of the interrupt as pending, so that interrupt controller 200 subsequently re-attempts to send the interrupt to processor core 150 for processing.

In some embodiments, after the priority threshold in threshold comparison module 234 is set using threshold setting module 238 and threshold clearing module 239 and after the interrupt processing state meets a predetermined condition, the priority threshold can be automatically cleared to disable threshold comparison module 234 immediately after the priority processing on the specific interrupt is completed, so that the interrupt processing can be performed more efficiently in the presence of interrupt nesting.

Figure 4:
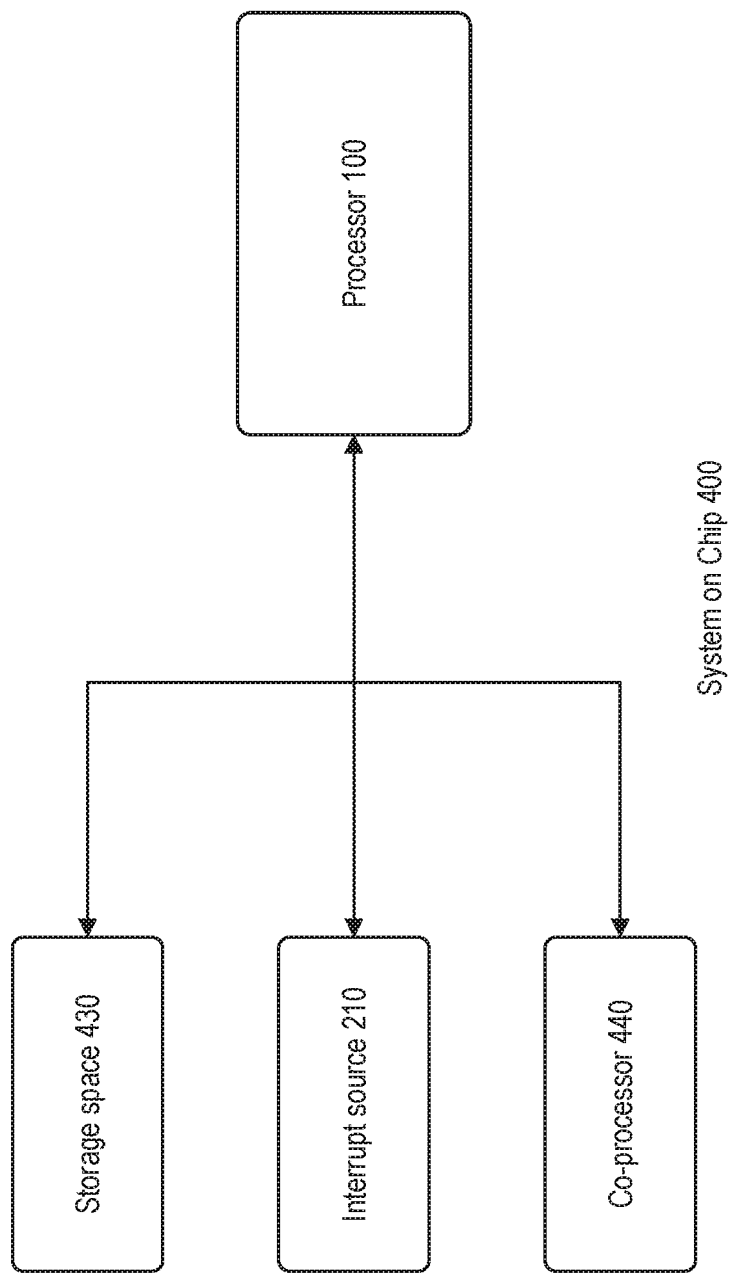
FIG. 4 is a schematic diagram of an example system on chip, according to some embodiments of the present disclosure.

FIG. 4 is a schematic diagram of an example system on chip, according to some embodiments of the present disclosure. As shown in FIG. 4, system on chip 400 can include processor 100 described with reference to FIG. 1, interrupt sources 210 described with reference to FIG. 1 and FIG. 2, a storage space 430, a co-processor 440, etc. In some embodiments, system on chip 400 can be integrated on a circuit board to constitute a relatively complete processing system. Interrupt sources 210 can be, for example, a variety of peripheral interfaces. Interrupt sources 210 can be configured to receive an external input and output the processed output of processor 100. Storage space 430 can provide an external storage space for processor 100 to store codes to be executed by processor 100 and a variety of output data generated. Co-processor 440 can be a dedicated processor configured to perform specialized processing tasks, such as image processing.

Figure 5:
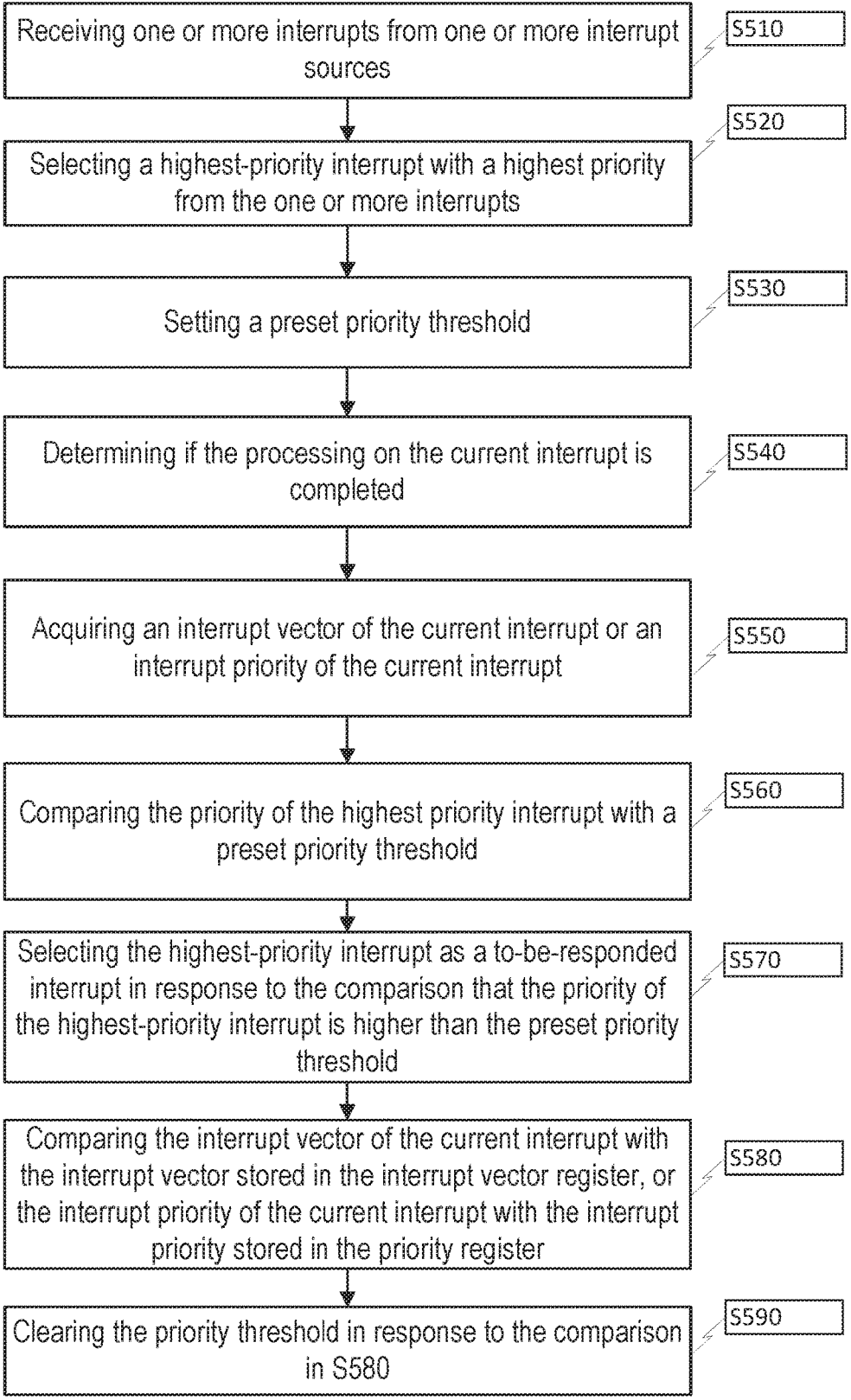
FIG. 5 is a flowchart of an example method processing interrupts in a processor, according to some embodiments of the present disclosure.

Embodiments of the present disclosure further provides a method to process interrupts in a processor. FIG. 5 is a flowchart of an example method processing interrupts in a processor, according to some embodiments of the present disclosure. As shown in FIG. 5, an interrupt processing method 500 can be performed in processing system 190 of FIG. 1, or interrupt controller 200 of FIG. 2. It is appreciated that some steps in method 500 have been described in the steps of processing system 190 and interrupt controller 200 in FIG. 1 and FIG. 2 and will not be repeated here.

In step S510, one or more interrupts are received from one or more interrupt sources. In some embodiments, the one or more interrupts can be of different types, and the one or more interrupt sources can be I/O devices, clocks, or software-based interrupts. In some embodiments, the one or more interrupt sources are similar to interrupt sources 210 of FIG. 1 or FIG. 2.

In step S520, a highest-priority interrupt with a highest priority from the one or more interrupts is selected. It is appreciated that step S520 can be executed through interrupt controller 200 of FIG. 1 and FIG. 2 or arbitration unit 230 of FIG. 2.

In step S530, a preset priority threshold is set. In some embodiments, setting the preset priority threshold includes storing an interrupt vector corresponding to the priority threshold in an interrupt vector register (e.g., interrupt vector register 260 of FIG. 2), or storing an interrupt priority of a to-be-processed interrupt having a priority not higher than a threshold in a priority register (priority register 270 of FIG. 2). It is appreciated that step S530 can be executed through interrupt controller 200 of FIG. 1 and FIG. 2 or threshold setting module 238 of FIG. 2.

In step S540, in response to the processor executing an interrupt return instruction, it is determined if the processing on the current interrupt is completed. It is appreciated that step S540 can be executed through interrupt controller 200 of FIG. 1 and FIG. 2 or arbitration unit 230 of FIG. 2.

In step S550, in response to a determination that the processing on the current interrupt is completed, an interrupt vector of the current interrupt or an interrupt priority of the current interrupt is acquired. It is appreciated that step S550 can be executed through interrupt controller 200 of FIG. 1 and FIG. 2 or arbitration unit 230 of FIG. 2.

In step S560, the priority of the highest priority interrupt is compared with a preset priority threshold. It is appreciated step S560 can be executed through interrupt controller 200 of FIG. 1 and FIG. 2 or arbitration unit 230 of FIG. 2.

In step S570, in response to a comparison from step S560 that the priority of the highest-priority interrupt is higher than the preset priority threshold, the highest-priority interrupt is selected as a to-be-responded interrupt. It is appreciated step S570 can be executed through interrupt controller 200 of FIG. 1 and FIG. 2 or arbitration unit 230 of FIG. 2.

In step S580, the interrupt vector of the current interrupt is compared with the interrupt vector stored in the interrupt vector register, or the interrupt priority of the current interrupt is compared with the interrupt priority stored in the priority register. It is appreciated that step S580 can be executed through interrupt controller 200 of FIG. 1 and FIG. 2 or arbitration unit 230 of FIG. 2.

In step S590, in response to the comparison in step S580 that the interrupt vector of the current interrupt is same as the interrupt vector stored in the interrupt vector register, or the interrupt priority of the current interrupt is same as the interrupt priority stored in the priority register, the priority threshold is cleared. In some embodiments, an extra condition is included in step S590, and the extra condition is a determination that the processing of the current interrupt is completed. It is appreciated that step S590 can be executed through interrupt controller 200 of FIG. 1 and FIG. 2 or threshold clearing module 239 of FIG. 2.

The various example embodiments described herein are described in the general context of method steps or processes, which may be implemented in one aspect by a computer program product, embodied in a computer-readable medium, including computer-executable instructions, such as program code, executed by computers to program the processors (e.g., processor 100 and processor 200). A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1. An interrupt controller in a processor, comprising:
an interrupt sampling circuitry configured to receive one or more interrupts from one or more interrupt sources that are communicatively coupled to the interrupt controller; and
an arbitration circuitry configured to select a to-be-responded interrupt from the received one or more interrupts, the arbitration circuitry comprising:
a selection circuitry configured to select from the one or more interrupts a highest-priority interrupt that has a highest priority among the one or more interrupts; and
a threshold comparison circuitry communicatively coupled to the selection circuitry, the threshold comparison circuitry configured to compare the priority of the highest-priority interrupt with a preset priority threshold,
wherein the arbitration circuitry is configured to select the highest-priority interrupt as the to-be-responded interrupt in response to the threshold comparison circuitry determining that the priority of the highest-priority interrupt is higher than the preset priority threshold.

2. The interrupt controller of clause 1, wherein the arbitration circuitry further comprises:
a threshold setting circuitry configured to set the preset priority threshold; and
a threshold clearing circuitry configured to clear the preset priority threshold.

3. The interrupt controller of clause 2, wherein the threshold clearing circuitry is further configured to:
determine that processing on a current interrupt is completed in response to the processor executing an interrupt return instruction.

4. The interrupt controller of clause 3, further comprising an interrupt vector register, wherein:
in response to setting the preset priority threshold, the threshold setting circuitry is further configured to store an interrupt vector corresponding to the priority threshold in the interrupt vector register;
the threshold clearing circuitry is further configured to acquire an interrupt vector of an interrupt being currently processed in the processor as the interrupt vector of the current interrupt; and
in response to a determination that the processing of the current interrupt is completed and a determination that the interrupt vector of the current interrupt is same as the interrupt vector stored in the interrupt vector register, the threshold clearing circuitry is further configured to clear the priority threshold.

5. The interrupt controller of clause 3, further comprising a priority register, wherein:
in response to setting the preset priority threshold, the threshold setting circuitry is further configured to store an interrupt priority of a to-be-processed interrupt having a priority not higher than a threshold in the priority register;
the threshold clearing circuitry is further configured to acquire an interrupt priority of an interrupt being processed in the processor as the interrupt priority of the current interrupt; and
in response to a determination that the processing of the current interrupt is completed and a determination that the interrupt priority of the current interrupt is same as the interrupt priority stored in the priority register, the threshold clearing circuitry is further configured to clear the priority threshold.

6. The interrupt controller of any one of clauses 2-5, wherein the threshold clearing circuitry is further configured to clear the priority threshold in response to a determination that there is no interrupt nesting.

7. The interrupt controller of any one of clauses 2-6, wherein the threshold setting circuitry is further configured to set an interrupt priority of one of the interrupts being currently processed as the priority threshold.

8. The interrupt controller of any one of clauses 2-7, wherein the threshold clearing circuitry is further configured to clear the priority threshold by setting the priority threshold as a lowest interrupt priority.

9. The interrupt controller of any one of clauses 2-8, further comprising:
an interrupt configuring circuitry configured to store interrupt priorities and interrupt processing states of the one or more interrupts, wherein:
the threshold clearing circuitry is further configured to determine, according to the interrupt priorities of the one or more interrupts stored in the interrupt configuring circuitry, whether there is interrupt nesting, and
the threshold setting circuitry is further configured to determine, according to the interrupt processing states of the one or more interrupts stored in the interrupt configuring circuitry, an interrupt being currently processed.

10. The interrupt controller of any one of clauses 1-9, wherein the arbitration circuitry further comprises:
a priority comparison circuitry communicatively coupled to selection circuitry, the priority comparison circuitry configured to compare the priority of the highest-priority interrupt with the priority of an interrupt currently executed in the processor, wherein:

the arbitration circuitry is further configured to select the highest-priority interrupt as the to-be-responded interrupt in response to the threshold comparison circuitry determining that the priority of the highest-priority interrupt is higher than the set priority threshold and the priority comparison circuitry determining that the priority of the highest-priority interrupt is higher than the priority of the interrupt currently executed in the processor.

11. A processor, comprising:

a processor core; and an interrupt controller communicatively coupled with the processor core, the interrupt controller comprising:

an interrupt sampling circuitry configured to receive one or more interrupts from one or more interrupt sources that are communicatively coupled to the interrupt controller; and an arbitration circuitry configured to select a to-be-responded interrupt from the received one or more interrupts, the arbitration circuitry comprising:

a selection circuitry configured to select from the one or more interrupts a highest-priority interrupt that has a highest priority among the one or more interrupts; and a threshold comparison circuitry communicatively coupled to the selection circuitry, the threshold comparison circuitry configured to compare the priority of the highest-priority interrupt with a preset priority threshold, wherein the arbitration circuitry is configured to select the highest-priority interrupt as the to-be-responded interrupt in response to the threshold comparison circuitry determining that the priority of the highest-priority interrupt is higher than the preset priority threshold.

12. The processor of clause 11, wherein:

in response to a determination that an interrupt priority of the interrupt selected by the interrupt controller is higher than an interrupt priority of an interrupt being currently processed in the processor core, the processor core is configured to suspend processing of the interrupt being currently processed and start processing of the interrupt selected by the interrupt controller.

13. The processor of clause 11 or 12, wherein the processor core is configured to not process the interrupt selected by the interrupt controller in response to a determination that the interrupt priority of the interrupt selected by the interrupt controller is not higher than that of the interrupt being currently processed in the processor core.

14. A system on chip, comprising:

a processor, comprising:

a processor core; and an interrupt controller communicatively coupled with the processor core, the interrupt controller comprising:

an interrupt sampling circuitry configured to receive one or more interrupts from one or more interrupt sources that are communicatively coupled to the interrupt controller; and an arbitration circuitry configured to select a to-be-responded interrupt from the received one or more interrupts, the arbitration circuitry comprising:

a selection circuitry configured to select from the one or more interrupts a highest-priority interrupt that has a highest priority among the one or more interrupts; and a threshold comparison circuitry communicatively coupled to the selection circuitry, the threshold comparison circuitry configured to compare the priority of the highest-priority interrupt with a preset priority threshold, wherein the arbitration circuitry is configured to select the highest-priority interrupt as the to-be-responded interrupt in response to the threshold comparison circuitry determining that the priority of the highest-priority interrupt is higher than the preset priority threshold, and one or more interrupt sources communicatively coupled to the processor, the one or more interrupt sources are configured to generate interrupts to be processed by the processor.

15. A method for executing interrupts in a processor, the method comprising:

receiving one or more interrupts from one or more interrupt sources;

selecting from the one or more interrupts a highest-priority interrupt that has a highest priority among the one or more interrupts;

comparing the priority of the highest-priority interrupt with a preset priority threshold; and in response to a comparison that the priority of the highest-priority interrupt is higher than the preset priority threshold, selecting the highest-priority interrupt as a to-be-responded interrupt.

16. The method of clause 15, further comprising:

setting the preset priority threshold;

determining that processing on a current interrupt is completed in response to the processor executing an interrupt return instruction; and clearing the preset priority threshold.

17. The method of clause 16, further comprising:

in response to setting the preset priority threshold, storing an interrupt vector corresponding to the priority threshold in an interrupt vector register;

acquiring an interrupt vector of the current interrupt; and in response to a determination that the processing of the current interrupt is completed and a determination that the interrupt vector of the current interrupt is same as the interrupt vector stored in the interrupt vector register, clearing the priority threshold.

18. The method of clause 17, further comprising:

in response to setting the preset priority threshold, storing an interrupt priority of a to-be-processed interrupt having a priority not higher than a threshold in a priority register;

acquiring an interrupt priority of the current interrupt; and in response to a determination that the processing of the current interrupt is completed and a determination that the interrupt priority of the current interrupt is same as the interrupt priority stored in the priority register, clearing the priority threshold.

19. The method of any one of clauses 16-18, further comprising:

determining, according to the interrupt priorities of the one or more interrupts, whether there is interrupt nesting; and clearing the priority threshold in response to a determination that there is no interrupt nesting.

20. A non-transitory computer readable medium that stores a set of instructions that is executable by one or more processors of an apparatus to cause the apparatus to initiate an instruction execution method for executing interrupts in a processor, the method comprising:

receiving one or more interrupts from one or more interrupt sources;

selecting from the one or more interrupts a highest-priority interrupt that has a highest priority among the one or more interrupts;

comparing the priority of the highest-priority interrupt with a preset priority threshold; and in response to a comparison that the priority of the highest-priority interrupt is higher than the preset priority threshold, selecting the highest-priority interrupt as a to-be-responded interrupt.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. An interrupt controller in a processor, comprising:
an interrupt sampling circuitry configured to receive one or more interrupts from one or more interrupt sources that are communicatively coupled to the interrupt controller;
an arbitration circuitry configured to select a to-be-responded interrupt from the received one or more interrupts, the arbitration circuitry comprising:
  a selection circuitry configured to select from the one or more interrupts a highest-priority interrupt that has a highest priority among the one or more interrupts,
  a threshold setting circuitry configured to:
    set the preset priority threshold, and
    store, in response to setting the preset priority threshold, a priority indicator in a priority indicator register,
  a threshold comparison circuitry communicatively coupled to the selection circuitry, the threshold comparison circuitry configured to:
    determine that processing on a current interrupt is completed in response to the processor executing an interrupt return instruction, and
    compare the priority of the highest-priority interrupt with the preset priority threshold, and
  a threshold clearing circuitry configured to:
    determine that a current priority indicator matches the stored priority indicator, and
    clear, in response to the determination that the processing of the current interrupt is completed and the determination that the current priority indicator matches the stored priority indicator, the preset priority threshold;
  wherein the current priority indicator comprises a current interrupt vector and the stored priority indicator comprises a stored interrupt vector or the current priority indicator comprises a current interrupt vector priority and the stored priority indicator comprises a stored interrupt vector priority; and
  wherein the arbitration circuitry is configured to select the highest-priority interrupt as the to-be-responded interrupt in response to the comparison between the priority of the highest-priority interrupt and the preset priority threshold.

2. The interrupt controller of claim 1, wherein the threshold clearing circuitry is further configured to clear the preset priority threshold in response to a determination that there is no interrupt nesting.

3. The interrupt controller of claim 1, wherein the threshold setting circuitry is further configured to set an interrupt priority of one of the interrupts being currently processed as the preset priority threshold.

4. The interrupt controller of claim 1, wherein the threshold clearing circuitry is further configured to clear the priority threshold by setting the priority threshold as a lowest interrupt priority.

5. The interrupt controller of 1, further comprising:
an interrupt configuring circuitry configured to store interrupt priorities and interrupt processing states of the one or more interrupts, wherein:
  the threshold clearing circuitry is further configured to determine, according to the interrupt priorities of the one or more interrupts stored in the interrupt configuring circuitry, whether there is interrupt nesting, and
  the threshold setting circuitry is further configured to determine, according to the interrupt processing states of the one or more interrupts stored in the interrupt configuring circuitry, an interrupt being currently processed.

6. The interrupt controller of claim 1, wherein the arbitration circuitry further comprises:
a priority comparison circuitry communicatively coupled to the selection circuitry, the priority comparison circuitry configured to compare the priority of the highest-priority interrupt with the priority of the current interrupt, wherein:
  the arbitration circuitry is further configured to select the highest-priority interrupt as the to-be-responded interrupt in response to:
  the comparison between the priority of the highest-priority interrupt and the preset priority threshold; and
  the comparison between the priority of the highest-priority interrupt and the priority of the current interrupt.

7. A processor, comprising:
a processor core; and
an interrupt controller communicatively coupled with the processor core, the interrupt controller comprising:
  an interrupt sampling circuitry configured to receive one or more interrupts from one or more interrupt sources that are communicatively coupled to the interrupt controller; and
  an arbitration circuitry configured to select a to-be-responded interrupt from the received one or more interrupts, the arbitration circuitry comprising:
    a selection circuitry configured to select from the one or more interrupts a highest-priority interrupt that has a highest priority among the one or more interrupts,
    a threshold setting circuitry configured to:
      set the preset priority threshold, and
      store, in response to setting the preset priority threshold, a priority indicator in a priority indicator register,
    a threshold comparison circuitry communicatively coupled to the selection circuitry, the threshold comparison circuitry configured to:

determine that processing on a current interrupt is completed in response to the processor executing an interrupt return instruction, and compare the priority of the highest-priority interrupt with a preset priority threshold, and a threshold clearing circuitry configured to:

determine that a current priority indicator matches the stored priority indicator, and clear, in response to the determination that the processing of the current interrupt is completed and the determination that the current priority indicator matches the stored priority indicator, the preset priority threshold;

wherein the current priority indicator comprises a current interrupt vector and the stored priority indicator comprises a stored interrupt vector or the current priority indicator comprises a current interrupt vector priority and the stored priority indicator comprises a stored interrupt vector priority; and wherein the arbitration circuitry is configured to select the highest-priority interrupt as the to-be-responded interrupt in response to the comparison between the priority of the highest-priority interrupt and the preset priority threshold.

8. The processor of claim 7, wherein:

in response to a determination that an interrupt priority of the interrupt selected by the interrupt controller is higher than an interrupt priority of the current interrupt, the processor core is configured to suspend processing of the current interrupt and start processing of the interrupt selected by the interrupt controller.

9. The processor of claim 7, wherein the processor core is configured to not process the interrupt selected by the interrupt controller in response to a determination that an interrupt priority of the interrupt selected by the interrupt controller is not higher than an interrupt priority of the current interrupt.

10. A system on chip, comprising:

a processor, comprising:

a processor core; and an interrupt controller communicatively coupled with the processor core, the interrupt controller comprising:

an interrupt sampling circuitry configured to receive one or more interrupts from one or more interrupt sources that are communicatively coupled to the interrupt controller; and an arbitration circuitry configured to select a to-be-responded interrupt from the received one or more interrupts, the arbitration circuitry comprising:

a selection circuitry configured to select from the one or more interrupts a highest-priority interrupt that has a highest priority among the one or more interrupts, a threshold setting circuitry configured to:

set the preset priority threshold, and store, in response to setting the preset priority threshold, a priority indicator in a priority indicator register, a threshold comparison circuitry communicatively coupled to the selection circuitry, the threshold comparison circuitry configured to:

determine that processing on a current interrupt is completed in response to the processor executing an interrupt return instruction, and compare the priority of the highest-priority interrupt with a preset priority threshold, and a threshold clearing circuitry configured to:

determine that a current priority indicator matches the stored priority indicator, and clear, in response to the determination that the processing of the current interrupt is completed and the determination that the current priority indicator matches the stored priority indicator, the preset priority threshold;

wherein the current priority indicator comprises a current interrupt vector and the stored priority indicator comprises a stored interrupt vector or the current priority indicator comprises a current interrupt vector priority and the stored priority indicator comprises a stored interrupt vector priority; and wherein the arbitration circuitry is configured to select the highest-priority interrupt as the to-be-responded interrupt in response to the comparison between the priority of the highest-priority interrupt and the preset priority threshold, and one or more interrupt sources communicatively coupled to the processor, the one or more interrupt sources are configured to generate interrupts to be processed by the processor.

11. A method for executing interrupts in a processor, the method comprising:

setting a preset priority threshold;

receiving one or more interrupts from one or more interrupt sources;

selecting from the one or more interrupts a highest-priority interrupt that has a highest priority among the one or more interrupts;

comparing the priority of the highest-priority interrupt with the preset priority threshold; and in response to the comparison between the priority of the highest-priority interrupt and the preset priority threshold, selecting the highest-priority interrupt as a to-be-responded interrupt;

storing, in response to setting the preset priority threshold, a priority indicator in a priority indicator register;

determining that processing on a current interrupt is completed in response to the processor executing an interrupt return instruction;

determine that a current priority indicator matches the stored priority indicator;

in response to a determination that the processing of the current interrupt is completed and a determination that a current priority indicator matches the stored priority indicator, clearing the priority threshold; and wherein the current priority indicator comprises a current interrupt vector and the stored priority indicator comprises a stored interrupt vector or the current priority indicator comprises a current interrupt vector priority and the stored priority indicator comprises a stored interrupt vector priority.

12. The method of claim 11, further comprising:

determining, according to interrupt priorities of the one or more interrupts, whether there is interrupt nesting; and clearing the priority threshold in response to a determination that there is no interrupt nesting.

13. A non-transitory, computer-readable medium that stores a set of instructions that is executable by one or more processors of an apparatus to cause the apparatus to initiate an instruction execution method for executing interrupts in a processor, the method comprising:

setting a preset priority threshold;

receiving one or more interrupts from one or more interrupt sources;
selecting from the one or more interrupts a highest-priority interrupt that has a highest priority among the one or more interrupts;
comparing the priority of the highest-priority interrupt with the preset priority threshold; and
in response to the comparison between the priority of the highest-priority interrupt and the preset priority threshold, selecting the highest-priority interrupt as a to-be-responded interrupt;
storing, in response to setting the preset priority threshold, a priority indicator in a priority indicator register;
determining that processing on a current interrupt is completed in response to the processor executing an interrupt return instruction;
determine that a current priority indicator matches the stored priority indicator;
in response to a determination that the processing of the current interrupt is completed and a determination that a current priority indicator matches the stored priority indicator, clearing the priority threshold; and
wherein the current priority indicator comprises a current interrupt vector and the stored priority indicator comprises a stored interrupt vector or the current priority indicator comprises a current interrupt vector priority and the stored priority indicator comprises a stored interrupt vector priority.

* * * * *